(12) United States Patent
Liberty

(10) Patent No.: US 7,653,771 B2
(45) Date of Patent: Jan. 26, 2010

(54) CONTROL DOCKING UNIT

(75) Inventor: Joshua P. Liberty, Escondido, CA (US)

(73) Assignee: Sony Computer Entertainment America Inc., Foster City, CA (US)

( * ) Notice: Subject to any disclaimer, the term of this patent is extended or adjusted under 35 U.S.C. 154(b) by 62 days.

(21) Appl. No.: 11/233,275

(22) Filed: Sep. 22, 2005
(Under 37 CFR 1.47)

(65) Prior Publication Data
US 2007/0174531 A1 Jul. 26, 2007

(51) Int. Cl.
*G06F 13/00* (2006.01)
(52) U.S. Cl. .......................................... 710/303; 463/37
(58) Field of Classification Search ................. 710/303; 463/36–38
See application file for complete search history.

(56) References Cited

U.S. PATENT DOCUMENTS

| | | | | |
|---|---|---|---|---|
| 6,238,289 B1 * | 5/2001 | Sobota et al. ................. | 463/39 |
| 6,462,942 B1 * | 10/2002 | McClendon et al. ........ | 361/683 |
| 6,530,838 B2 * | 3/2003 | Ha et al. ....................... | 463/36 |
| D492,294 S * | 6/2004 | Kim .......................... | D14/240 |
| 6,811,491 B1 * | 11/2004 | Levenberg et al. ............. | 463/47 |
| D500,319 S * | 12/2004 | Wada ......................... | D14/401 |
| D544,481 S * | 6/2007 | Maddox et al. ............ | D14/401 |
| 2003/0220141 A1 * | 11/2003 | Corrigan et al. ............... | 463/36 |
| 2003/0220988 A1 * | 11/2003 | Hymel ........................ | 709/220 |
| 2004/0014528 A1 * | 1/2004 | Leifer .......................... | 463/44 |
| 2004/0235566 A1 * | 11/2004 | Hussaini et al. ............... | 463/37 |
| 2006/0094512 A1 * | 5/2006 | Yoshino et al. ............... | 463/47 |
| 2006/0252537 A1 * | 11/2006 | Wu ............................. | 463/36 |

\* cited by examiner

*Primary Examiner*—Mark Rinehart
*Assistant Examiner*—Nimesh G Patel
(74) *Attorney, Agent, or Firm*—Townsend and Townsend and Crew LLP

(57) ABSTRACT

A control docking unit configured to accept a portable processing unit and provide alternate control operation of the portable processing unit. The control docking unit can be configured to position a display on the portable processing unit to facilitate use of one or more controls provided on the control docking unit. The control docking unit can position the display of the portable processing unit in a fixed or variable position. The controls from the docking unit can be coupled to the portable processing unit using an electrical, mechanical, or electromechanical interface. The electrical interface can be a wired or wireless communication link. The controls on the control docking unit can be configured to be substantially in the same configuration as a control unit for a similar fixed device. The portable processing unit can be configured to provide additional functions, features, or enhanced operation when coupled to the control docking unit.

29 Claims, 4 Drawing Sheets

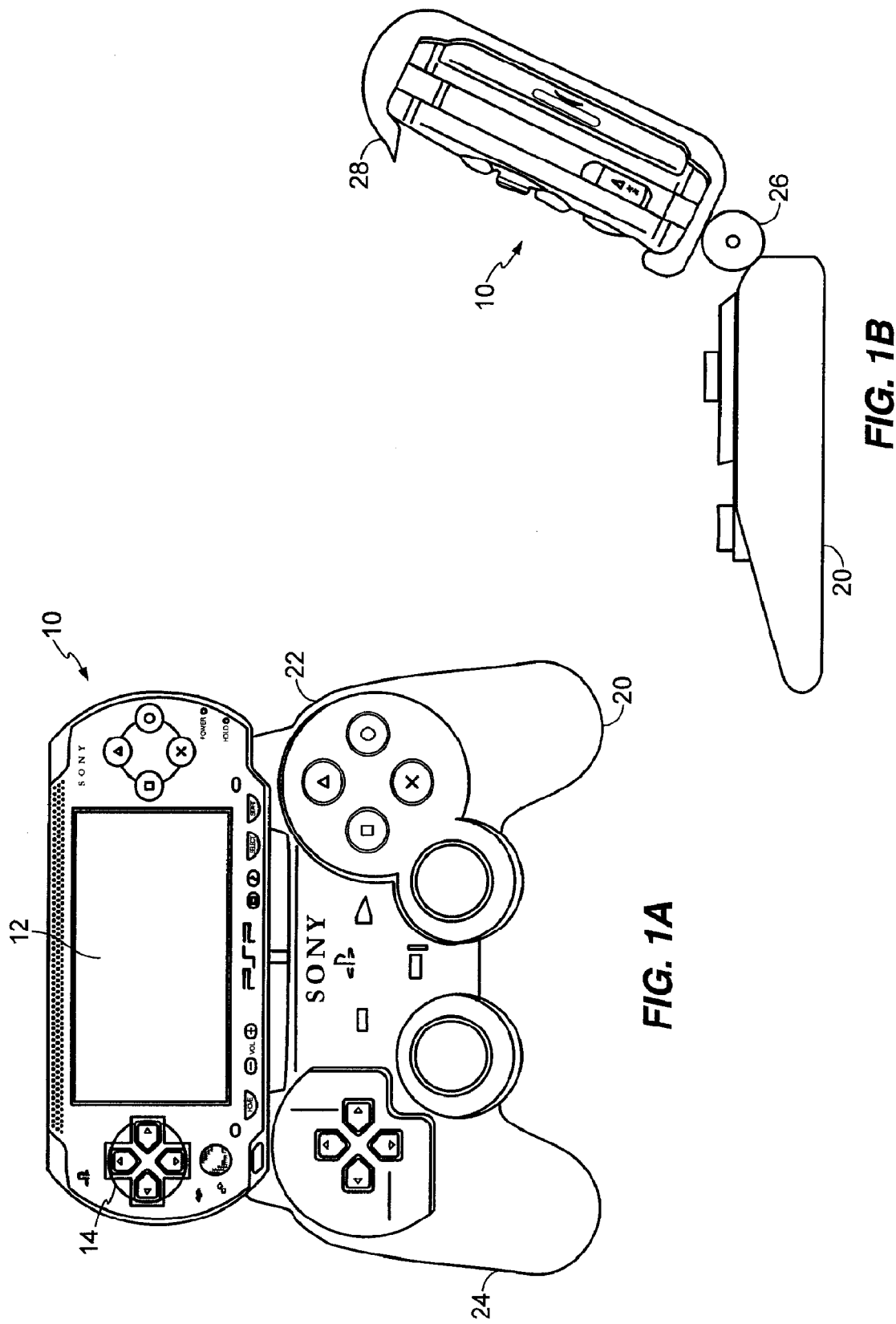

CONTROL DOCKING UNIT

BACKGROUND

The continual advancement of computer processing power is evident in the field of computer based gaming. Processor intensive video games were once available only in standalone dedicated units manufactured for use in arcades. As computer processing capabilities advanced, the price of powerful processors and associated electronics such as memory, interface chips, and displays, decreased to a level that allowed processor based games to be produced for the consumer market.

Processor based games are commonly available for use in conjunction with general purpose computers, such as a personal computer (PC). Additionally, processor based games are commonly available for execution on dedicated gaming platforms, commonly referred to a console systems. More recently, processor based games are available for execution on portable gaming platforms.

Portable processing units, such as portable gaming platforms, may be miniaturized versions of console systems. Portable gaming platforms can integrate substantially all of the functionality of console systems in a small, portable form factor. Portable gaming platforms can include one or more controls, and typically include a display. Other portable processing units, such as handheld computing devices, cordless or cellular telephones, and personal digital assistants typically have limited gaming capabilities.

Arcade units are typically configured to provide a single game, and are typically not easily reconfigurable. However, platforms such as general purpose computers, console systems, and portable gaming platforms typically can be reconfigured to perform different games merely by executing different software. The software can be supplied on a disc, magnetic media, memory, or some other storage media or combination of storage media. The platforms can be reconfigured by executing the software corresponding to the desired game.

As processor based games migrated from arcade units to console systems, manufacturers of the console systems attempted to emulate the arcade units by recreating the look and feel of the game. However, because console games are configured to support multiple game applications, the controllers associated with console games are typically generic, and do not precisely duplicate the controls of arcade games.

Similarly, PCs typically operate using input devices such as a keyboard in combination with a pointing device, such as a computer mouse. Such input devices likely do not even remotely duplicate the controls available on an arcade unit. However, PCs typically have one or more input ports, which may be labeled as game ports, that can be configured to accept accessories that can more closely resemble arcade unit controls.

Console systems implement increasingly powerful processors and the games or applications that can be executed on them become increasingly complex. The progression of games does not follow the historic path of arcade unit to console system. Indeed, the console system often represents the original platform on which a game is played.

The most popular games are often reconfigured for execution on portable processing units, and more particularly, on portable gaming units. However, the small physical size of typically portable processing units presents issues relating to duplicating the look and feel of games that are originally designed for execution on a console system.

The portable gaming unit often dedicates a majority of the user interface to a display unit. The user interface typically includes the controls. However, because of space limitations, the controls of a portable gaming unit often do not duplicate those found on a console system or control accessories available for a PC. At the very least, the controls of a portable gaming unit are physically smaller than controls on the other gaming platforms. Often, different control sets are implemented in to portable gaming units. Thus, it is difficult to duplicate the player experience for a game ported from a console system to a portable gaming unit.

Additionally, the controls of a portable gaming unit are typically built into the unit and are not user serviceable. The controls of portable gaming units typically are subjected to an intense working cycle. However, the user is unable to purchase a new control accessory as can be done for a typical console system.

The relationship of the controls to the display on a portable gaming unit may not be optimized for many users. However, because the position of the controls and display are fixed, the user is unable to adjust the configuration for user preferences.

Therefore, there are many issues with portable gaming units that are not found in console systems. However, as the processing power available in portable gaming units improves, portable gaming units will be able to execute increasingly complex applications. There is a strong likelihood that such portable gaming units will continue to be popular.

BRIEF SUMMARY

A control docking unit configured to accept a portable processing unit and provide alternate control operation of the portable processing unit. The control docking unit can be configured to position a display on the portable processing unit to facilitate use of one or more controls provided on the control docking unit. The control docking unit can position the display of the portable processing unit in a fixed or variable position. The controls from the docking unit can be coupled to the portable processing unit using an electrical, mechanical, or electromechanical interface. The electrical interface can be a wired or wireless communication link. The controls on the control docking unit can be configured to be substantially in the same configuration as a control unit for a similar fixed device. The portable processing unit can be configured to provide additional functions, features, or enhanced operation when coupled to the control docking unit.

An embodiment of the invention includes a control docking unit that includes a body portion and a mechanical interface coupled to the body portion and configured to couple to a portable processing unit. The control docking unit also includes a control module having at least one control positioned on the body portion and a control interface module coupled to the control module and configured to provide input to the portable processing unit in response to operation of the at least one control.

An embodiment of the invention includes a control docking unit that includes a body portion having dimensions similar to a control module for a gaming console system. The control docking unit also includes a mechanical interface coupled to the body portion and configured to couple to a portable gaming platform, a control module having at least one control positioned on the body portion, and a control interface module coupled to the control module and configured to provide input to the portable gaming platform in response to operation of the at least one control.

An embodiment of the invention includes a control docking unit that includes a body portion, means for coupling the body portion to a portable processing unit, means for accepting user input positioned on the body portion, and means for providing input to the portable processing unit in response to operation of the means for accepting user input.

An embodiment of the invention includes a method of operating a portable processing unit, that includes initializing an application, determining a presence of a control docking unit, and initializing docking unit controls in response to determining the presence of the control docking unit. The method can also include initializing an enhanced feature in the application in response to determining the presence of the control docking unit.

BRIEF DESCRIPTION OF THE DRAWINGS

The features, objects, and advantages of embodiments of the disclosure will become more apparent from the detailed description set forth below when taken in conjunction with the drawings, in which like elements bear like reference numerals.

FIGS. 1A-1D are simplified diagrams of embodiments of a portable unit docked to a control docking unit.

DETAILED DESCRIPTION OF EMBODIMENTS OF THE INVENTION

Figure 1C:
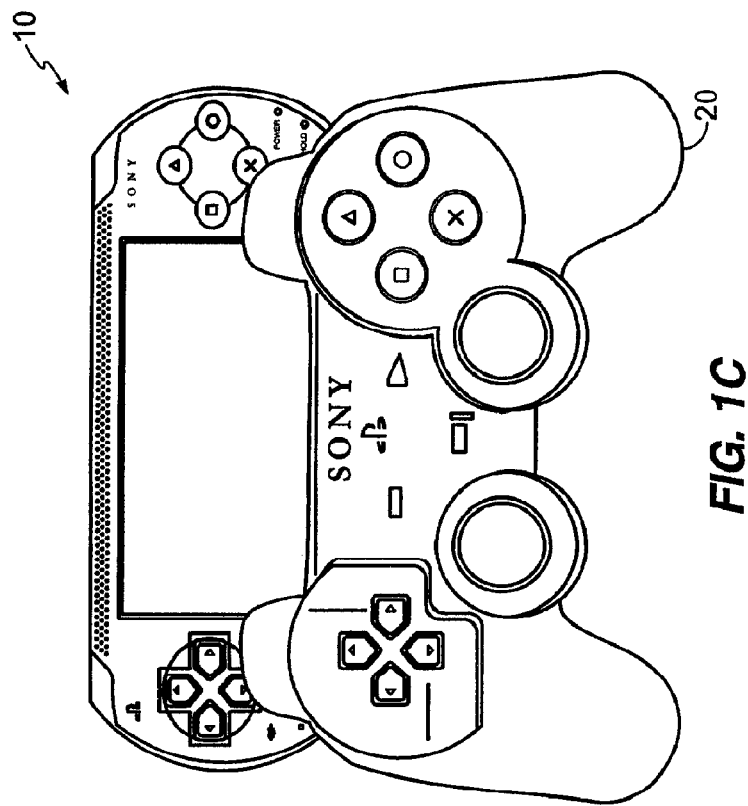

A control docking unit and methods of operating a system with a control docking unit are disclosed. The control docking unit can be configured to accept a portable processing unit and provide a set of alternate controls for the portable processing unit. In one embodiment, the control portion of the docking unit can substantially duplicate the controls associated with a distinct processing unit, such as a console system.

The portable processing unit can mechanically couple to the control docking unit using any of a variety of mechanical structures. For example, the portable processing unit can mechanically couple to the control docking unit using a physical interference, one or more fasteners, clamps, brackets, and the like, or a combination of mechanical couplings.

The controls of the control docking unit can couple to the portable processing unit using an electrical, mechanical, or electromechanical coupling. The control docking unit can be configured to communicate control information to the portable processing unit using wired, wireless, or a combination of wired and wireless communication links. Alternatively, or additionally, the control docking unit can communicate control information to the portable processing unit using mechanical coupling. For example, controls on the control docking unit can mechanically couple to controls on the portable processing unit, such that actuation of a control on the control docking unit results in a corresponding actuation of a control on the portable processing unit.

FIG. 1A is a simplified diagram of an embodiment of a portable processing unit 10 docked in a control docking unit 20. In the embodiment of FIG. 1A, the portable processing unit 10 is captured in a receptacle. The receptacle may, but need not encapsulate the entire portable processing unit 10. In other embodiments, the control docking unit 20 can include one or more clamps, fingers, extensions, and the like for positioning the portable processing unit 10. In one embodiment, one or more clips or snaps can retain the portable processing unit 10 to the receptacle. The control docking unit 20 may also utilize fasteners, loops, adhesives, and the like, or some combination thereof to couple the portable processing unit 10 to the control docking unit 20.

Portions of the control docking unit 20 can cover some or all of a front surface of the portable processing unit 10. Portions of the control docking unit 20 can be substantially transparent, such as portions overlaying the display 12 on the portable processing unit 10. Other portions of the control docking unit 20 may be opaque, and may occlude some or all of the controls 14 on the portable processing unit 10. In some embodiments, substantially all of the controls 14 of the portable processing unit 10 are accessible when the portable processing unit 10 is coupled to the control docking unit 10.

The control docking unit 20 can include controls 22 that can be used to control the portable processing unit 10 when it is coupled to the control docking unit 20. The controls 22 can be positioned on a body portion 24. The controls 22 and body portion 24 can be configured to substantially duplicate the form of a control unit for a similar processing system. For example, the body portion 24 and controls 22 can be configured to substantially duplicate a control unit used with a console system. Thus, when the control docking unit 20 is used to control an associated portable processing unit 10, the operation and feel of the controls is the same as a control unit for a console system. For example, the controls 22 can include button positioned on the left and right hand side of the control docking unit 20 as well as an analog style stick controls positioned on each side and configured to be operated with the corresponding hand.

A manufacturer can produce both a console system and a portable gaming unit. The manufacturer or some third party application developer can provide similar applications or games that execute on each of the operating platforms. For example, a developer can develop a version of a game originally developed for a console system for execution on the portable gaming unit. The user can use the control docking unit 20 so that the controls used to play the game on the portable gaming unit are the same as when the game is played on the console system.

In one embodiment, the control docking unit 20 can have a physical configuration that substantially duplicates a physical configuration for a controller of a console system having the same manufacturer as the portable processing unit 10 for which it is designed. In another embodiment, the physical configuration of the control docking unit 20 can substantially duplicate the physical configuration of a cross platform, where a cross platform refers to another manufacturers console system, another manufacturer's portable processing unit, an arcade unit, a PC based controller, and the like. In a cross platform configuration, the user can use a preferred control configuration regardless of the manufacturer of the portable processing unit 10.

FIG. 1B is a side view of the embodiment of the portable processing unit 10 docked in the control docking unit 20 shown in FIG. 1A. In the embodiment shown in FIG. 1B, the control docking unit 20 utilizes a flexible clip 28 to retain the portable processing unit 10 within a receptacle that extends along the back of the portable processing unit 10.

The lower end of the receptacle includes a hinge 26 that allows the receptacle and associated portable processing unit 10 to rotate relative to the control portion of the control docking unit 20. The hinge 26 allows the user to adjust the orientation of the portable processing unit 10 when captured in the control docking unit 20.

FIG. 1C is a view of another embodiment of a portable processing unit 10 coupled to a control docking unit 20. In the embodiment of FIG. 1C, at least a portion of the portable processing unit 10 fits into a receptacle of the control docking unit 20. The orientation of the portable processing unit 10 is fixed when captured in the control docking unit 20.

A portion of the control docking unit 20 can cover some or all of the controls on the portable processing unit 10. In such an embodiment, a user is unable to directly access at least some of the controls of the portable processing unit 10. A user accesses the controls of the control docking unit 20 to control at least some of the operations of the portable processing unit 10 when it is docked to the control docking unit 20.

Figure 1D:
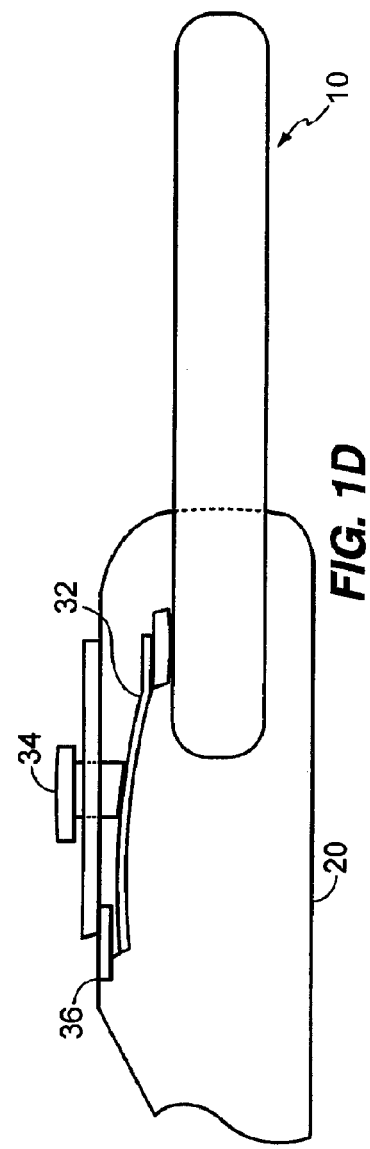

FIG. 1D shows a cross sectional view of the portable processing unit 10 coupled to the control docking unit 20. The view details an embodiment of a mechanical coupling between a control 34 on the control docking unit and a corresponding control 16 on the portable processing unit 10. It is possible to reduce or eliminate the amount of electrical connections and active devices within the control docking unit 20 by implementing mechanical coupling.

In the embodiment shown in FIG. 1D, a control 34 on the control docking unit 20, such as a button or switch, can be configured to apply pressure to a flexible lever 32 when depressed or otherwise operated. The flexible lever 32 can be fastened at one end to a mount 36 within the control docking unit 20.

The control 34 can be configured with a stop or otherwise can be configured to provide a mechanical limit to the range of operation. Thus, regardless of the force exerted on the control 34 of the control docking unit 20, the amount of operating force applied by the flexible lever 32 to the control 16 of the portable processing unit 10 is constrained to a predetermined range. Limiting the force applied to the control 16 of the portable processing unit 10 may be advantageous in prolonging the life of the control 16.

Of course, a mechanical coupling does not require the use of a flexible lever 32 and other configurations for mechanical coupling may be implemented by the control docking unit 20. For example, a control 34 or button on the control docking unit 20 may be positioned substantially over the corresponding control 16 on the portable processing unit 10, such that operation of the control 34 is directly translated to corresponding control 16 on the portable processing unit 10. In another embodiment, the mechanical coupling between the control 34 on the control docking unit 20 and the corresponding control 16 on the portable processing unit 10 may be accomplished using electromechanical devices, pneumatic devices, hydraulic devices, or some other apparatus or combination of apparatus.

Figure 2:
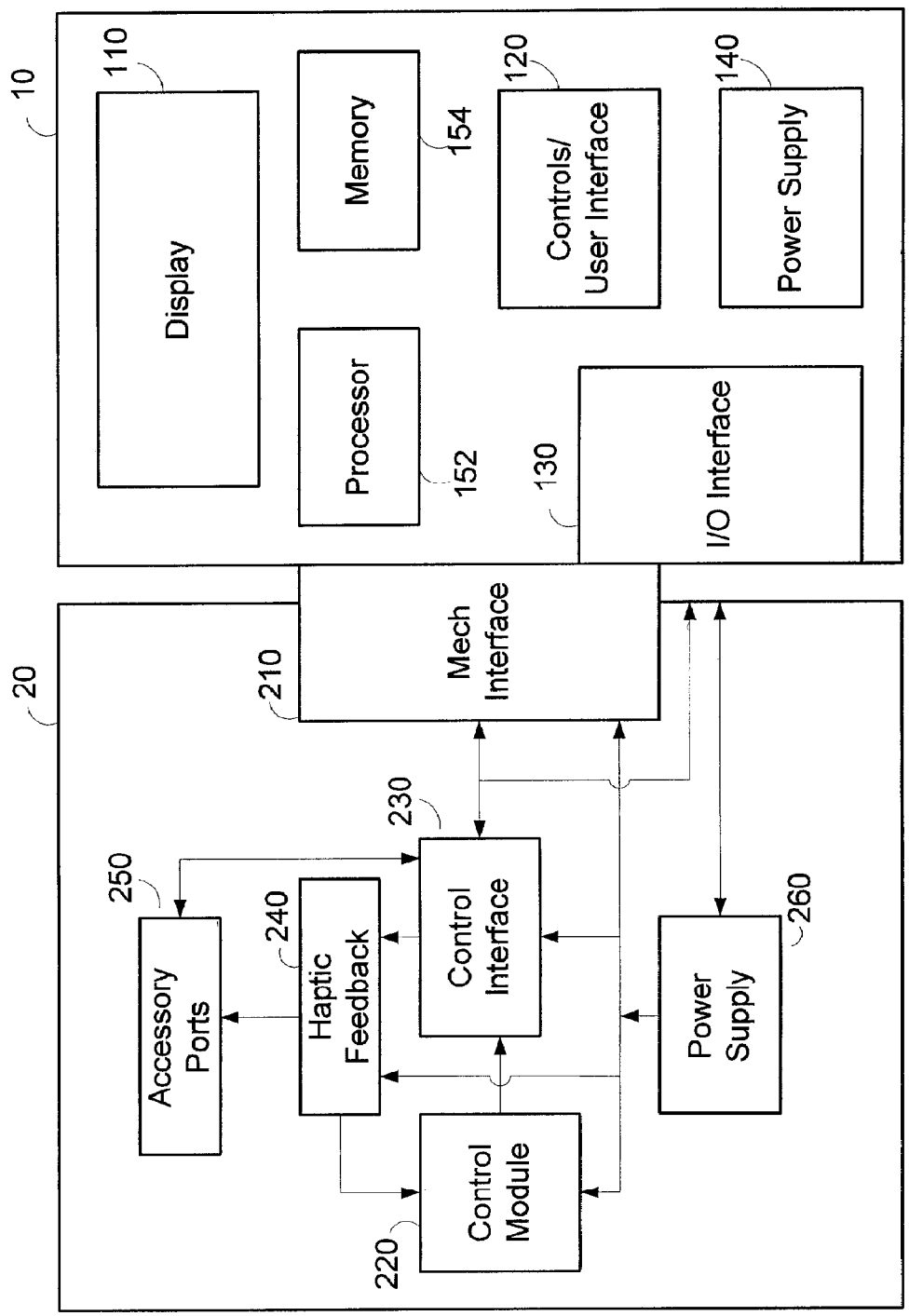
FIG. 2 is a simplified block diagram of an embodiment of a control docking unit with a portable unit.

FIG. 2 is a simplified functional block diagram of an embodiment of a portable processing unit 10 coupled to a control docking unit 20. The embodiment of the control docking unit 20 includes numerous optional modules that may be omitted from other embodiments. Additionally, each of the modules within the control docking unit 20 can have multiple embodiments and variations.

The embodiment of the portable processing unit 10 is representative of typical portable processing units. Not all portable processing units will have every module shown in the embodiment of FIG. 2.

The portable processing unit 10 includes a display 110 that is configured to provide visual output to a user. The portable processing unit 10 can also include controls or some type of user interface 120. The portable processing unit 10 can include a power supply 140 and input/output interface 130.

The portable processing unit 10 typically includes a processor 152 in communication with memory 154. The processor 152 typically accesses the memory 154 to access and execute one or more applications stored in memory 154. The memory 154 can include one or more memory modules. Some or all of the memory modules can be removable memory modules. In other embodiments, some or all of the memory modules are internal to the portable processing unit 10 and are permanently fixed to the unit. The memory 154 can include, but is not limited to, ROM, including EPROM and EEPROM, RAM, including volatile and non-volatile RAM, FLASH, magnetic storage, optical storage, and the like, or some combination of storage devices.

In one embodiment, the memory 154 can include removable optical disks configured to store application program information that can be executed by the processor 152. In other embodiments, the memory 154 can include removable electronic storage, such as cartridges, cards, or modules that can include application program information that can be executed by the processor 152.

The user interface 120 typically includes one or more controls that can be accessed and operated by the user. Although the user interface is shown distinct from the display 110, it is understood that one or more user interface modules can be operable via the display 110, for example, the display 110 can be implemented as a touch screen display, and one or more "soft" keys or controls can be implemented on the display 110.

The I/O interface 130 can include one or more ports that allow external interface with the portable processing unit 10. The one or more ports can be physical ports or electronic ports. The physical ports can be implemented on the housing of the portable processing unit 10, while the electronic ports may not be physically visible. For example, the I/O interface 130 can include one or more output jacks that can be used to interface with external speakers, headphones, microphones, external controllers, external displays, and the like. The I/O interface 130 can also include one or more power jacks or ports that can be used to supply power to the portable processing unit 10 or that can be used to source power from the portable processing unit 10. The I/O interface 130 can also include such electronic interfaces such as wireless communication interfaces, which can include RF interfaces, optical interfaces, magnetic interfaces, and the like. A wireless interface can operate in accordance with an industry standard, such as IEEE 802.11 wireless standard. An optical interface can include an IR interface.

The power supply 140 can include an internal power supply or an external power supply, or some combination of internal and external power supplies. For example, the power supply 140 can include a battery module having one or more batteries internal to the portable processing unit 10. The battery module can allow the portable processing unit 10 to operate independent of any wired power grid or wired power supply. In another embodiment, the portable processing unit 10 can include an internal power converter that can be configured to accept an external power source, such as AC power, and can convert the power to a form usable by the portable processing unit 10. In other embodiments, the power supply 140 can include an external power converter, such as a wall transformer, that is configured to plug into a power source and provide power to the portable processing unit 10. The power converters can be configured to concurrently power the portable processing unit 10 and charge the battery module where the power supply 140 includes a combination of power converter and battery module.

The control docking unit 20 can be configured to couple with the portable processing unit 10. In one embodiment, the control docking unit 20 can be configure to couple with a single type of portable processing unit 10. In other embodiments, the control docking unit 20 can be configured as a generic unit that is able to couple to more than one type of portable processing unit 10. In other embodiments, the control docking unit 20 can be configured to couple with predetermined types or families of portable processing units 10.

The control docking unit 20 can be configured to substantially duplicate the controls of some other control unit. For example, the control docking unit 20 can provide substantially the same size and control orientation of a controller for a console system. In one embodiment, the control docking unit 230 is configured to support a portable gaming platform from a first manufacturer, and the control docking unit 20 is configured to provide substantially the same size and control orientation as a controller for a console system from the first manufacturer. In another embodiment, the control docking unit 20 can be configured to provide substantially the same size and control orientation as a controller for a console system from a second manufacturer distinct from the first manufacturer.

The control docking unit 20 can include a mechanical interface 210. The mechanical interface 210 may be integral to the control docking unit 20 or may extend from a body portion of the control docking unit 20. The mechanical interface 210 is configured to couple to the portable processing unit 10.

The control docking unit 20 can also include a control module 220 that includes one or more controls accessible and operable by the user. The controls in the control module 220 can couple to a control interface module 230 where operation of a control on the control module 220 is translated by the control interface module 230 to a form a usable by the portable processing unit 10.

The control interface module 230 can also be configured to receive external input, for example, from the portable processing unit 10. The control interface module 230 can couple the external input to one or more of the other modules. For example, the control docking unit 20 can include a haptic feedback module 240 that provides haptic feedback to one or more of the controls in the control module 220. The control interface module 230 can receive the haptic feedback information from the portable processing unit 10 and format the information for use by the haptic feedback module 240.

The control docking unit 20 can also include one or more accessory ports 250. The control docking unit 20 can also include a power supply module 260.

The mechanical interface 210 can be configured to support, mate, or otherwise couple to the portable processing unit 10. In one embodiment, the mechanical interface 210 is configured to allow a user to vary the orientation of the portable processing unit 10 relative to a body portion of the control docking unit. As shown in FIG. 1B, the mechanical interface 210 can include a hinge that allows the portable processing unit 10 to rotate along the hinge axis. Other configurations can be used to allow repositioning of the portable processing unit 10. For example, the mechanical interface 210 can include one or more rotating mount, flexible mount, extendible mount, and the like to allow repositioning of the portable processing unit 10.

The mechanical interface 210 can include any manner of securing the portable processing unit 10 to the control docking unit 20. For example, the mechanical interface 210 can include one or more fasteners, receptacles, adhesive portions, clamps, springs, latches, and the like to secure the portable processing unit 10.

The mechanical interface 210 can be configured to allow access to some or all of the controls on the portable processing unit 10. For example, the mechanical interface 210 can allow the user to access and operate one or more of the controls on the portable processing unit 10 when coupled to the control docking unit 20. In another embodiment, the mechanical interface 210 can be configured to occlude or prevent access to one or more controls on the portable processing unit 10. Additionally, the mechanical interface 210 can be configured to cover some or all of the display 110 on the portable processing unit 10. The cover can be at least partially transparent to allow the user to view the display 110. Alternatively, a portion of the cover can be substantially opaque, such that portions of the portable processing unit 10 are no longer visible when the portable processing unit 10 is coupled to the control docking unit 20.

The control interface module 230 can be coupled to the control module 220 and can operate to receive input signals from the control module 220 and process the input to a format suitable for communication to the portable processing unit 10. The control interface 230 can include a mechanical interface, electrical interface, electromechanical interface, or some combination of interfaces.

The control interface module 230 can be configured to determine that a portable processing unit 10 is coupled to the control docking unit 20. The control interface unit 230 can be configured to indicate to the portable processing unit 10 the presence of the control docking unit 20 when the two are coupled.

The control interface 230 can couple signals to the portable processing unit 10 using a wired connection or a wireless connection. A wired connection can be made through a port or connector on the portable processing unit 10 via the mechanical interface 210. Alternatively, the control interface module 230 can include one or more cables, wires, or connections that may separately mate with a connector, port, or receptacle on the portable processing unit 10.

The control interface module 230 can include one or more wireless interfaces that are configured to communicate with complementary interfaces on the portable processing unit 10. For example, the control interface module 230 can receive control input from the controls on the control module 220 and process them to wireless signals that are broadcast or otherwise communicated to the portable processing unit 10. The wireless signals can include RF signals that operate in accordance with a proprietary standard or an industry standard for example, the control interface module 230 can transform control inputs to IEEE 802.11 RF signals that are transmitted to a complementary interface on the portable processing unit 10. In another embodiment, the control interface module 230 can transform the control input signals to optical signals, such as IR signals, that are coupled to an IR receiver on the portable processing unit 10.

If the interface between the controls on the control module 220 and the controls on the portable processing unit 10 include mechanical interfaces, the control interface 230 can include on or more mechanical interfaces coupling the two. Some interfaces can include a combination of mechanical and electrical interfaces, and the control interface module 230 can be configured to provide the appropriate function.

The control interface module 230 can also operate to receive input from one or more external devices. The control interface module 230 can be coupled to the accessory ports 250 and can receive and process signals received by the accessory ports 250 for transmission or coupling to the portable processing unit 10. The control interface module 230 can also receive The accessory ports 250 can include one or more ports configured to couple and interface with one or more external devices. For example, the accessory ports can include a connector configured to accept a wired connector, such as a wired connector from a controller of a console system. In this embodiment, the control docking unit 20 can operate as a hub to allow the connection of multiple controllers.

In another embodiment, the accessory ports 250 can include one or more output ports or bidirectional communication ports. For example, one accessory port can be a display port that is configured to supply display signals for an external display. In another embodiment, the one or more output ports can include one or more audio ports configured to provide audio output or electrical signals for an audio output device.

The control interface module 230 can also receive communications or controls from the portable processing unit 10. For example, the control interface module 230 can receive haptic feedback information from the portable processing unit 10 during execution of an application. The control interface module 230 can process the haptic feedback information and communicate it to the haptic feedback module 240 where the haptic feedback can be coupled to the control module 220 or one or more external devices, via the accessory ports 250.

The power supply module 260 can be configured to power the control docking unit 20, the portable processing unit, or a combination of the control docking unit 20 and the portable processing unit 10. Similar to the power supply 140 within the portable processing unit 10, the power supply module 260 in the control docking unit 20 can include some combination of power supplies in conjunction with a battery module.

In one embodiment, the power supply module 260 operates to power the portable processing unit 10 and recharge batteries in the portable processing unit 10 when the portable processing unit 10 is coupled to the control docking unit 20. In another embodiment, the power supply module 260 can include one or more power filters or conditioners and the control docking unit 20 can operate from power supplied by the portable processing unit 10. In another embodiment, the power supply module 260 can be configured to supply power to the control docking unit 20 independent to the portable processing unit 10.

The portable processing unit 10 can be configured to operate substantially the same when coupled to the control docking unit 20. That is, in one embodiment, the portable processing unit 10 utilizes the control docking unit as a controller. In another embodiment, operation of the portable processing unit 10 may differ when coupled to the control docking unit 20.

For example, an application executing on the portable processing unit 10 may operate in one configuration when the portable processing unit 10 operates independently and may operate in another configuration when the portable processing unit 10 is coupled to the control docking unit 20 and operates in conjunction with the control docking unit 20. In such an embodiment, the application executing on the portable processing unit 10 can be configured to provide additional or extended features that take advantage of the control docking unit 20.

In one embodiment, the portable processing unit 10 can determine that it is coupled to the control docking unit 20 and the execution of an application can differ when the portable processing unit 10 is coupled to the control docking unit 20. Because the portable processing unit 10 may have a different control configuration than that offered on the control docking unit 20, the portable processing unit 10 may be configured to support the control configuration offered on the control docking unit 20. For example, the portable processing unit 10 can be configure to accept control inputs via a wireless interface when coupled to the control docking unit 20 and can allow additional or different control inputs for the application. In another embodiment, the application executing on the portable processing unit 10 can be configured to provide enhanced functionality or features when the portable processing unit 10 is coupled to the control docking unit 20.

Figure 3:
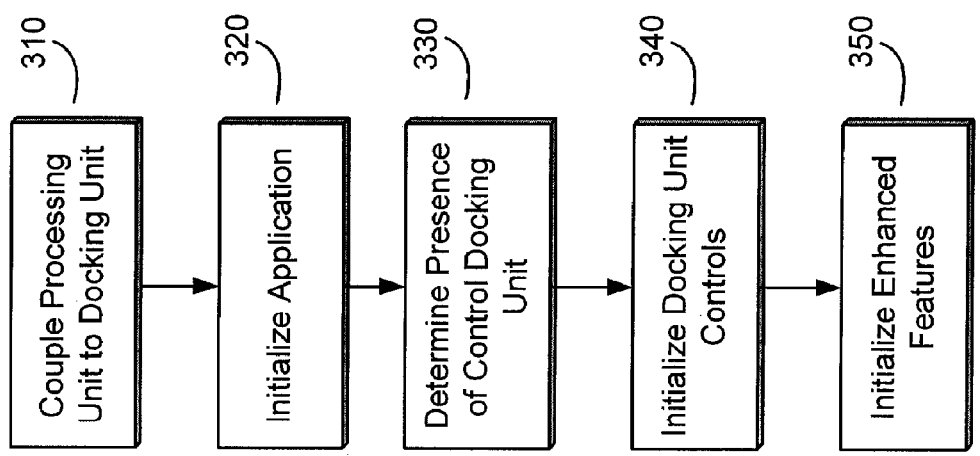
FIG. 3 is a simplified flowchart of an embodiment of a method of operating a portable unit coupled to a control docking unit.

FIG. 3 is a simplified flowchart of an embodiment of a method 300 of operating a portable processing unit coupled to a control docking unit. The method 300 can be performed by the portable processing unit in conjunction with the control docking unit, except for the initial coupling step that can be performed by a user of the portable processing unit for example, the method 300 can be performed by the units shown in FIG. 2.

The method 300 begins at block 310 where a user couples the portable processing unit to the control docking unit. The process of coupling the portable processing unit to the control docking unit can include securing the portable processing unit to the predetermined location of the control docking unit. Coupling the portable docking unit may also include connecting one or more electrical connectors or operating one or more mechanical retainers.

In one embodiment, the user couples the portable processing unit to the control docking unit with the portable processing unit de-energized or in an "off" or "standby" condition. In another embodiment, the user can couple the portable processing unit to the control docking unit with either the portable processing unit, the control docking unit, or both units in an operational state. Coupling the two units when either unit is energized may be referred to as hot docking of the unit, where the term "hot" generally refers to electrically energized.

After coupling the two units, the user can proceed to block 320. The user, or alternatively, the portable processing unit can initialize an application. If the portable processing unit and control docking unit are coupled with either or both de-energized, the user may manually energize one or both units. In another embodiment, the user may only need to energize one of the units and the unit may energize the complementary unit.

Once the units are energized, the portable processing unit can initialize an application. In one embodiment, the user selects an application and instructs the portable processing unit to initialize the application. In such an embodiment, the portable processing unit can receive an application selection and receive an initialization command or instruction.

In another embodiment, the portable processing unit can automatically select and initialize an application when it is energized. In another embodiment, the portable processing unit can be configured to automatically select and initialize an application upon receipt of a removable memory module having the application stored thereon. In yet another embodiment, the portable processing unit can select and initialize an application upon sensing a hot docking operation.

After initializing the application, the portable processing unit can proceed to block 330 and determine the presence of the control docking unit. The portable processing unit can be configured to determine the presence of the control docking unit automatically, via user input, or via a combination of automatic operation and user input.

In one embodiment, the portable processing unit may automatically determine the presence of a control docking unit based on a mechanical interface between the two units. For example, an extension or protrusion positioned on the control docking unit can compress a button or control on the portable processing unit. In another embodiment, the control docking unit can include an extension or protrusion positioned on the portable docking unit can occlude an optical link on the portable processing unit, thereby indicating the presence of a control docking unit.

In another embodiment, the portable processing unit can determine the presence of a control docking unit using electrical processes. For example, the control docking unit may broadcast its presence and the portable processing unit may be configured to receive the broadcast. In another embodiment, the portable processing unit may poll or otherwise request a link with a control docking unit and the control docking unit can be configured to respond to such a polling message.

In yet another embodiment, the portable processing unit may have one or more controls or control sequences that may be entered by a user to indicate the presence of the control docking unit. In such an embodiment, the portable processing unit determines a presence of the control docking unit in response to the receipt of the control input or sequence of control inputs.

In another embodiment, the application may query the user as to the presence of the control docking unit, and the portable processing unit can determine the presence of the portable processing unit in response to the user input to the query. In an application based embodiment, the portable processing unit may determine the presence of the control docking unit solely in response to the user input and regardless of any physical coupling to the control docking unit. In another embodiment, the portable processing unit may determine the presence of the control docking unit by monitoring the user input to the application query and in combination with one or more physical sensors.

After determining the presence of the control docking unit, the portable processing unit can proceed to block 340 and initialize the docking unit control. In one embodiment, the portable processing unit may initialize a wireless link that is used to communicate user input received at the control docking unit to the portable processing unit. The portable processing unit may also configure the application to accept the range of user inputs defined by the control processing unit. For example, the control docking unit may have more or different user controls than are available on the portable processing unit, and the portable processing unit may configure the application to an alternative command set corresponding to the control docking unit.

After initializing or otherwise enabling the controls of the control docking unit, the portable processing unit can proceed to block 350 and initialize any enhanced features or alternative execution available in the presence of the control docking unit.

It may be illustrative to examine an example of the method 300 of FIG. 3 in the context of a portable processing unit that is implemented as a portable gaming platform. In one embodiment, a portable processing unit can be a portable gaming platform, such as a PSP™ available from Sony.

The portable gaming platform can be configured to play many games that were originally designed for the PS™ or PS2™ console systems and that were ported for execution on the portable gaming platform. The control docking unit can be configured to have a body portion that has substantially the same control configuration, operation, and dimensions as a controller for the PS™ or PS2™ console systems. Thus, when playing a game ported to execute on the portable gaming platform, the user can utilize substantially, if not identically, the same control sequence as used with the console system.

The user can couple the portable gaming platform to the control docking unit and can initialize both the portable gaming platform as well as the control docking unit. As described earlier, energizing the control docking unit may energize and initialize the portable gaming platform.

The user can then select and initialize a game. For example, the user can insert a game disk into the portable gaming platform and initialize the game. The user can initialize the game using the controls on the portable gaming platform, or alternatively, can initialize the game using the controls of the control docking unit.

In one embodiment, the portable gaming unit can initialize the controls of the control docking unit prior to initializing the application. The portable gaming platform can utilize a wireless communication link, for example a wireless LAN, to communicate the control information.

The application can query the user for operation using the control docking unit. The application, via the portable gaming unit, can determine the presence of the control docking unit and can initialize the docking unit controls.

The portable gaming platform can then enable or otherwise make available enhanced features or alternative execution that is available when it is determined that the control docking unit is present. The user can then use the controls available on the control docking unit to play the game and control the portable gaming unit.

A control docking unit for use with a portable processing unit and methods for operating a portable processing unit when docked with a control docking unit are described. The control docking unit can be configured to provide a physical and control interface that facilitates user control of the portable processing unit. The physical dimensions and the control layout of the body portion of the control docking unit can be configured to substantially duplicate similar control units. For example, the control docking unit can be configured to substantially duplicate the dimensions and controls available on a controller for a console gaming system.

The portable processing unit can be configured to operate in response to the controls of the control docking unit. In some embodiments, the portable processing unit can be configured to provide enhanced or special features within applications when coupled to the control docking unit.

The various illustrative logical blocks, modules, and circuits described in connection with the embodiments disclosed herein may be implemented or performed with a general purpose processor, a digital signal processor (DSP), a Reduced Instruction Set Computer (RISC) processor, an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any processor, controller, microcontroller, or state machine. A processor may also be implemented as a combination of computing devices, for example, a combination of a DSP and a microprocessor, a plurality of microprocessors, one or more microprocessors in conjunction with a DSP core, or any other such configuration.

A software module may reside in RAM memory, flash memory, non-volatile memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor.

The steps of a method, process, or algorithm described in connection with the embodiments disclosed herein may be embodied directly in hardware, in a software module executed by a processor, or in a combination of the two. The various steps or acts in a method or process may be performed in the order shown, or may be performed in another order. Additionally, one or more process or method steps may be omitted or one or more process or method steps may be added to the methods and processes. An additional step, block, or action may be added in the beginning, end, or intervening existing elements of the methods and processes.

The above description of the disclosed embodiments is provided to enable any person of ordinary skill in the art to make or use the disclosure. Various modifications to these embodiments will be readily apparent to those of ordinary skill in the art, and the generic principles defined herein may be applied to other embodiments without departing from the spirit or scope of the disclosure. Thus, the disclosure is not intended to be limited to the embodiments shown herein but is to be accorded the widest scope consistent with the principles and novel features disclosed herein.

What is claimed is:

1. A control docking apparatus, the apparatus comprising:
   a body portion;
   a mechanical interface coupled to the body portion and configured to couple to a portable gaming platform;
   a control module having a first plurality of controls positioned on the body portion, a configuration of the first plurality of controls having a size and orientation substantially corresponding to a control configuration for a gaming console; and
   a control interface module coupled to the control module and configured to provide input to the portable gaming platform in response to operation of at least one of the first plurality of controls, the portable gaming platform having a second plurality of controls differing in at least one of size, number, and orientation from the first plurality of controls,
   wherein the control interface module is configured to indicate to the portable gaming platform a presence of the control docking apparatus when the mechanical interface is coupled to the portable gaming platform,
   wherein the portable gaming platform is operable to execute an application having a first version developed for execution on the gaming console and a second version developed for execution on the portable gaming platform, and
   wherein the second version of the application when executing on the portable gaming platform is operable to utilize a first control scheme for the first plurality of controls when the control docking apparatus is coupled to the portable gaming platform, the first control scheme substantially corresponding to a console control scheme utilized by the first version of the application when executing on the gaming console, and operable to utilize a second control scheme for the second plurality of controls when the control docking apparatus is not coupled to the portable gaming platform.

2. The apparatus of claim 1, wherein the body portion has substantially a same dimension as a controller for a gaming console system.

3. The apparatus of claim 1, wherein the mechanical interface comprises a receptacle configured to receive at least a portion of the portable gaming platform.

4. The apparatus of claim 1, wherein the mechanical interface comprises a receptacle within the body portion and configured to receive at least a portion of the portable gaming platform.

5. The apparatus of claim 1, wherein the mechanical interface comprises an adjustable mount configured to allow reorienting of the portable-gaming platform relative to the body portion.

6. The apparatus of claim 1, wherein the mechanical interface comprises means for adjusting an orientation of the portable gaming platform relative to the body portion.

7. The apparatus of claim 1, wherein the mechanical interface comprises a hinged mount.

8. The apparatus of claim 1, wherein the mechanical interface comprises a portion configured to obscure at least a portion of a user interface on the portable gaming platform.

9. The apparatus of claim 1, wherein the mechanical interface comprises a mount configured to allow user access to substantially all of a user interface on the portable gaming platform.

10. The apparatus of claim 1, wherein the control module comprises at least one limiter configured to limit a mechanical travel of the control from the control module that mechanically engages a control positioned on the portable gaming platform.

11. The apparatus of claim 1, wherein the control module comprises a keypad.

12. The apparatus of claim 1, wherein the control module comprises a plurality of keypads positioned on the body portion to facilitate thumb operation.

13. The apparatus of claim 1, wherein the control interface module comprises an electrical interface configured to provide an electrical signal to the portable gaming platform in response to operation of the at least one control.

14. The apparatus of claim 1, wherein the control interface module comprises a wireless interface configured to transmit a wireless signal to the portable gaming platform in response to operation of the at least one control.

15. The apparatus of claim 14, wherein the wireless interface comprises a wireless communication link selected from the group consisting of an RF link, an optical link, an audio link, or a combination of RF, optical, and audio links.

16. The apparatus of claim 1, wherein the control interface module comprises a receiver configured to couple one or more signals from the portable gaming platform to one or more modules of the control docking apparatus.

17. The apparatus of claim 1, further comprising a haptic feedback module coupled to the control interface module and configured to provide haptic feedback to the control module.

18. The apparatus of claim 1, further comprising at least one accessory port coupled to the control interface module and configured to allow coupling an external device with the portable gaming platform.

19. The apparatus of claim 18, wherein the accessory port comprises at least one receptacle positioned on the body portion and configured to receive a wired connector.

20. The apparatus of claim 18, wherein the accessory port comprises a wireless receiver.

21. The apparatus of claim 1, further comprising a power supply module configured to supply power to at least the control interface module.

22. The apparatus of claim 21, wherein the power supply module is configured to supply power to the portable gaming platform when the portable gaming platform is coupled to the control docking apparatus.

23. The apparatus of claim 21, wherein the power supply module is configured to receive power from the portable gaming platform coupled to the control docking apparatus and direct the power to at least the control interface module.

24. A control docking apparatus, the apparatus comprising:
   a body portion having dimensions similar to a control module for a gaming console system;
   a mechanical interface coupled to the body portion and configured to couple to a portable gaming platform;

a control module having a first plurality of controls positioned on the body portion, a configuration of the first plurality of controls having a size and orientation substantially corresponding to a control configuration for the gaming console system; and a control interface module coupled to the control module and configured to provide input to the portable gaming platform in response to operation of at least one of the first plurality of controls, the portable gaming platform having a second plurality of controls differing in at least one of size, number, and orientation from the first plurality of controls, wherein the control interface module is configured to indicate to the portable gaming platform a presence of the control docking apparatus when the mechanical interface is coupled to the portable gaming platform, wherein the portable gaming platform is operable to execute an application having a first version developed for execution on the gaming console system and a second version developed for execution on the portable gaming platform, and wherein the second version of the application when executing on the portable gaming platform is operable to utilize a first control scheme for the first plurality of controls when the control docking apparatus is coupled to the portable gaming platform, the first control scheme substantially corresponding to a console control scheme utilized by the first version of the application when executing on the gaming console system, and operable to utilize a second control scheme for the second plurality of controls when the control docking apparatus is not coupled to the portable gaming platform.

25. A control docking apparatus, the apparatus comprising:
a body portion;
means for coupling the body portion to a portable gaming platform, wherein the means for coupling the body portion to the portable gaming platform is configured to allow reorienting of the portable gaming platform relative to the body portion;
first means for accepting user input via a first plurality of controls positioned on the body portion and having a size and orientation substantially corresponding to a control configuration for a gaming console system; and
means for providing input to the portable gaming platform in response to operation of at least one of the first plurality of controls, the portable gaming platform having a second means for accepting user input via a second plurality of controls,
wherein the means for providing input is configured to indicate a presence to the portable gaming platform when coupled to the portable gaming platform,
wherein the portable gaming platform is operable to execute an application having a first version developed for execution on the gaming console system and a second version developed for execution on the portable gaming platform, and wherein the second version of the application when executing on the portable gaming platform is operable to utilize a first control scheme for the first plurality of controls when the control docking apparatus is coupled to the portable gaming platform, the first control scheme substantially corresponding to a console control scheme utilized by the first version of the application when executing on the gaming console system, and operable to utilize a second control scheme for the second plurality of controls when the control docking apparatus is not coupled to the portable gaming platform.

26. The apparatus of claim 25, wherein the means for providing input to the portable gaming platform comprises means for providing a wireless signal to the portable gaming platform.

27. The apparatus of claim 25, wherein the means for providing input to the portable gaming platform comprises means for providing a mechanical force to a control positioned on the portable gaming platform.

28. The apparatus of claim 25, further comprising means for supplying electrical power to the control docking apparatus.

29. A control docking apparatus, the apparatus comprising:
a body portion;
a mechanical interface coupled to the body portion and configured to couple to a portable gaming platform;
a control module having a first plurality of controls positioned on the body portion, the first plurality of controls having a size and orientation substantially corresponding to a control configuration for a gaming console; and
a control interface module coupled to the control module and configured to provide input to the portable gaming platform in response to operation of at least one of the first plurality of controls, at least one control of the portable gaming platform being accessible independent of a presence of the control docking apparatus, the portable gaming platform having a second plurality of controls differing in at least one of size, number, and orientation from the first plurality of controls,
wherein an application executing on the portable gaming apparatus is operable to select from a plurality of control schemes based at least in part upon the presence of the control docking apparatus, the control schemes being selected from a first control scheme based at least in part upon a first control configuration for a first version of the application developed for execution on the portable gaming apparatus and utilizing the second plurality of controls, a second control scheme based at least in part upon a second control configuration for a second version of the application developed for execution on the gaming console utilizing the first plurality of controls, and a third control scheme including additional control options based at least in part upon a combined control configuration when the control docking apparatus is coupled to the portable gaming platform.

* * * * *

UNITED STATES PATENT AND TRADEMARK OFFICE
CERTIFICATE OF CORRECTION

PATENT NO.      : 7,653,771 B2  
APPLICATION NO. : 11/233275  
DATED           : January 26, 2010  
INVENTOR(S)     : Joshua P. Liberty Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 72 days.

Signed and Sealed this

Twenty-third Day of November, 2010

David J. Kappos  
*Director of the United States Patent and Trademark Office*